United States Patent
Frost

(10) Patent No.: US 10,949,901 B2
(45) Date of Patent: Mar. 16, 2021

(54) SYSTEMS AND METHODS FOR AUTOMATED CUSTOMER FULFILLMENT OF PRODUCTS

(71) Applicant: Frost, Inc., Boston, MA (US)

(72) Inventor: Matthew L. Frost, Boston, MA (US)

(73) Assignee: Frost, Inc., Boston, MA (US)

( * ) Notice: Subject to any disclaimer, the term of this patent is extended or adjusted under 35 U.S.C. 154(b) by 154 days.

(21) Appl. No.: 16/231,578

(22) Filed: Dec. 23, 2018

(65) Prior Publication Data

US 2019/0197544 A1    Jun. 27, 2019

Related U.S. Application Data

(60) Provisional application No. 62/609,872, filed on Dec. 22, 2017.

(51) Int. Cl.

| | |
|---|---|
| G06Q 30/06 | (2012.01) |
| G07F 9/00 | (2006.01) |
| G07G 1/00 | (2006.01) |
| G06Q 20/18 | (2012.01) |
| G06Q 20/12 | (2012.01) |
| G06Q 20/40 | (2012.01) |
| G06Q 30/02 | (2012.01) |
| G07F 9/02 | (2006.01) |

(52) U.S. Cl.
CPC ......... *G06Q 30/0607* (2013.01); *G06Q 20/12* (2013.01); *G06Q 20/18* (2013.01); *G06Q 20/4014* (2013.01); *G06Q 30/0255* (2013.01); *G07F 9/002* (2020.05); *G07F 9/023* (2013.01); *G07G 1/0045* (2013.01)

(58) Field of Classification Search
CPC ........... G06Q 30/0607; G06Q 20/4014; G06Q 20/18; G06Q 20/12; G07F 9/002; G07F 9/003; G07G 1/0045
USPC ....................................................... 705/26.25
See application file for complete search history.

(56) References Cited

U.S. PATENT DOCUMENTS

| | | | |
|---|---|---|---|
| 5,722,526 A | * | 3/1998 | Sharrard ................. G07F 7/08 194/346 |
| 6,539,282 B2 | | 3/2003 | Metcalf |
| 6,711,465 B2 | | 3/2004 | Tomassi |
| 7,031,804 B2 | | 4/2006 | Brooke, Jr. |
| 7,123,989 B2 | | 10/2006 | Pinney |
| 7,783,379 B2 | | 8/2010 | Beane |
| 7,844,363 B1 | | 11/2010 | Mehidizadeh |
| 8,484,073 B2 | | 7/2013 | Perry |
| 8,660,539 B2 | | 2/2014 | Khambete |

(Continued)

OTHER PUBLICATIONS

Office Action from the United States Patent and Trademark Office for U.S. Appl. No. 16/899,221 dated Aug. 4, 2021 (21 pages).

(Continued)

*Primary Examiner* — Yogesh C Garg
(74) *Attorney, Agent, or Firm* — KW Law, LLP

(57) ABSTRACT

The systems and methods described herein may be used to distribute goods to a consumer. The system may comprise a distribution device and system, a regulatory system, a customer relationship management system and an artificial intelligence system. The methods may comprise distributing an item to a consumer in fully automated or a partially automated process. The methods may comprise distributing a item to a consumer in a manner compliant with regulations.

17 Claims, 10 Drawing Sheets

(56) References Cited

U.S. PATENT DOCUMENTS

| | | | |
|---|---|---|---|
| 8,825,526 B2 | 9/2014 | Peters | |
| 9,642,476 B1 | 5/2017 | Mehidizadeh | |
| 10,402,804 B1* | 9/2019 | Wittern, III | G06Q 20/342 |
| 2002/0087413 A1* | 7/2002 | Mahaffy | G10L 15/26 |
| | | | 705/16 |
| 2002/0156677 A1 | 10/2002 | Peters et al. | |
| 2007/0267479 A1 | 11/2007 | Nix | |
| 2009/0132813 A1* | 5/2009 | Schibuk | G06Q 20/322 |
| | | | 713/158 |
| 2010/0223135 A1 | 9/2010 | Griffin et al. | |
| 2010/0234987 A1* | 9/2010 | Benschop | G07F 5/18 |
| | | | 700/237 |
| 2010/0293050 A1 | 11/2010 | Maher et al. | |
| 2011/0082595 A1 | 4/2011 | Mehus | |
| 2015/0019340 A1 | 1/2015 | El-Masri et al. | |
| 2016/0155127 A1* | 6/2016 | Hartman | G06Q 20/18 |
| | | | 705/18 |
| 2016/0191507 A1* | 6/2016 | Bao | H04L 67/34 |
| | | | 455/411 |
| 2016/0379287 A1* | 12/2016 | Dabiri | G06Q 40/02 |
| | | | 705/26.43 |
| 2017/0364854 A1* | 12/2017 | Umematsu | G06Q 30/01 |
| 2018/0121980 A1* | 5/2018 | Blass | G06Q 10/087 |
| 2019/0114685 A1* | 4/2019 | Postrel | G07F 9/002 |

OTHER PUBLICATIONS

Final Office Action from the United States Patent and Trademark Office for U.S. Appl. No. 16/899,221 dated Oct. 8, 2020 (18 pages).

\* cited by examiner

Figure 1. System 100

700 ns of a new application, patent application, and patent application Serial No. 62/609,872 filed on Dec. 22, 2017 and entitled "SYSTEM AND METHOD FOR AUTOMATED CUSTOMER FULFILLMENT OF REGULATED PRODUCTS," which is incorporated by reference herein in its entirety for all purposes.

SYSTEMS AND METHODS FOR AUTOMATED CUSTOMER FULFILLMENT OF PRODUCTS

CROSS REFERENCE TO RELATED APPLICATIONS

This application claims priority to, and the benefit of, U.S. Provisional Patent Application Ser. No. 62/609,872 filed on Dec. 22, 2017 and entitled "SYSTEM AND METHOD FOR AUTOMATED CUSTOMER FULFILLMENT OF REGULATED PRODUCTS," which is incorporated by reference herein in its entirety for all purposes.

BACKGROUND

Field

The present disclosure relates to a system and method for automated fulfillment of products (e.g. goods). In particular, the disclosure relates to a system and method that can at least partially automate order fulfillment and dispensing of a product to a customer.

Background

Sales of restricted or regulated products such as controlled substances generally require, pursuant to certain laws, regulations or license requirements, a person-to-person sales exchange between the customer and the sales agent. The sales agent confirms certain qualifications of a prospective purchaser, such as proper age, legal residence, or other purchase eligibility criteria. The possibility of unlawful sales of regulated products is usually mitigated by state laws requiring, for example, that these products be secure and inaccessible to the general public, and their access being limited to authorized staff. Due to such regulations, fully automated vending is not compliant. Thus, the benefits and efficiencies of traditional methods of automated distribution of regulated goods cannot be recognized.

SUMMARY

The present disclosure includes systems, methods, and/or articles of manufacture for distribution of a product. In various embodiments, a system for compliant and automated customer fulfillment of a regulated product to a customer is provided. A system can comprise a product dispensing apparatus and a remote interface operable by an authorized agent. In various embodiments, a system can be configured such that a regulated product may only be dispensed to a customer in response to an input to the system by an authorized agent. In various embodiments, a system and/or remote interface may be interoperable with a product dispensing apparatus provided by third parties. In various embodiments, the components of a system or the steps of a method may be modularly and/or dynamically configurable to provide compatibility with a plurality of regulatory frameworks for regulated product sales.

In various embodiments, a method may comprise determining, by a first agent in a computer-based system for distributing regulated goods to a consumer, that the consumer is authorized to shop for the regulated goods. The systems enable a vending device, which is part of the system, to receive input from the consumer. The vending device receives input that includes a first item selected by the consumer. The regulated goods comprise a plurality of regulated items and the plurality of regulated items comprises the first item. The system transmits a distribution review request and receives a distribution authorization from a second agent. In various embodiments, the second agent is presented with the distribution request data and the second agent is a human person. A regulation governing the distribution of the item may require that a distribution review be conducted by a person. The distribution review request may include distribution request data comprises at least one of the first item, a distribution regulation, a consumer attribute, an attribute of the first item, a second item, an attribute of a second item, and a calculation based upon an attribute of the first item and an attribute of a second item. The second agent determines a distribution decision based upon the distribution request data and a third regulation associated with the regulated goods. Based upon the distribution decision, the second agent enters the distribution authorization into an input device in communication with the system. The vending device distributes the first item to the consumer.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
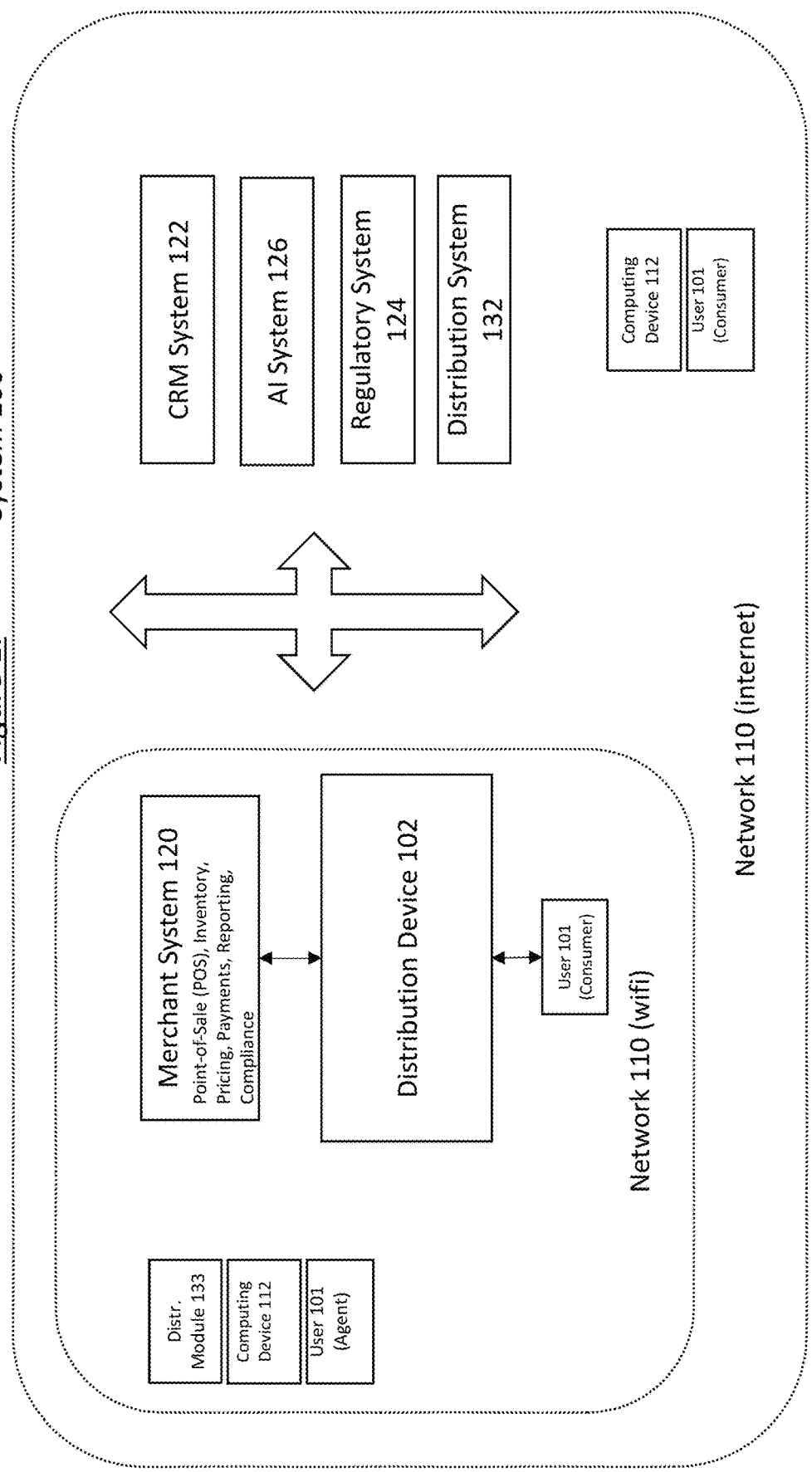
FIG. 1 shows an exemplary system diagram, in accordance with various embodiments.

The present disclosure provides a system and method for at least partially automated fulfillment of a customer order for a regulated product. In various embodiments, a system may comprise a product dispensing device configured to incorporate at least a portion of a disclosed system and perform at least a portion of a disclosed method. In various embodiments, a system may comprise a peripheral device separate and/or remote from the product dispensing apparatus. A peripheral device can be configured to control or perform various functions such as promotion, eligibility verification, retrieval, delivery, and payment exchange of a regulated or non-regulated product. In various embodiments, compliance with regulatory requirements need not be completely performed or assured by a product dispensing apparatus, and certain regulatory compliance measures may be performed or controlled by an authorized agent. A system may provide an authorized agent with assistance in performance of regulatory compliance measures through interactive features of the system. In various embodiments, a system may be configured so that no customer fulfillment may occur without the intervention of an authorized agent.

Currently distribution devices, such as vending machines, do not allow for and/or implement manual intervention. Such manual intervention may be preferred or required for both regulated and non-regulated goods. For regulated goods, manual intervention may enable the supervision and control required by states. There are opportunities to provide a compliant automated distribution method and system with process automation, remote access and device control technology in order to meet regulatory requirements, enable compliance across varying regulatory regimes, increase revenue, increase safety and education and enhance customer experience and outcomes While storing regulated products in secured physical locations may be an appropriate security measure, it creates significant inefficiencies in the sales and customer fulfillment process. Taking the customer order, waiting for identification, verifying identity, retrieving the controlled substance, and requesting payment are all steps that must be handled manually and in a specified sequence by a sales agent from start to finish.

Manual verification related to sales of regulated products is becoming an increasing burden to retailers and their staff, resulting in increased costs and decreased revenue. Reduced customer throughput can also impact tax revenue for governments in jurisdictions in which regulated products are sold, since reduced customer throughput can translate into lost sales opportunities and lost tax revenue that the regulatory framework often provides. Furthermore, since some tax write-offs are limited for distributors of a controlled substance that is federally illegal, in addition to the direct benefit of reducing the costs of distributors, it may also be beneficial to the distributors from tax standpoint.

While reducing costs to distributors and increasing revenue to tax jurisdictions and to distributors are monetary benefits of automating a compliant distribution process, there are benefits to the public as well. States have prohibited full automation of certain regulated goods or controlled substances such as cannabis for safety reasons. Realizing the efficiencies of automation while maintaining compliance with laws, regulations and rules provides safety benefits to the public. Examples of safety measures enabled include; requiring that tangible consumer identification is verified by a person at point of purchase; ensuring accumulators for daily purchase amounts are not exceeded—more specifically state-set product mixes that are difficult for employees to calculate accurately, creating a compliance gap and a safety issue; ensuring out of state customers are restricted in purchase amounts differently than in-state residents; preventing an industry term known as "smurfing" where customers can exceed daily purchase amounts by purchasing from multiple different stores; automated tracking of purchase history that does not breach individuals' data privacy rights; and configuration that ensures the distribution hardware meets state requirements for a restricted access area.

In addition to the safety benefits to consumers, compliant automation to consumers also provides for an enhanced and more effective use of regulated products by consumers. Providing innovative, AI driven, product recommendations will inform consumers of products that may meet the consumers medical, therapeutic or recreational needs more effectively and without unwanted effects. Similarly, compliant automation provides an opportunity to educate consumers on product benefits and safety considerations related to regulated items.

The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "consumer," "customer," "user," "account holder," "agent" or the like may be used interchangeably and may include any person, group, entity, business, organization, business, software, hardware, machine and/or combination of these, and may, in various embodiments, be associated with a transaction account. In various embodiments, an agent may include a human person that is trained, licensed, certified or otherwise authorized to perform certain steps, verifications or authorizations in accordance with regulations governing the marketing offer, sale or distribution or regulated items.

Phrases and terms similar to "business," "merchant," "service establishment," or "SE" may be used interchangeably with each other and shall mean any person, entity, distributor system, software and/or hardware that is a provider, broker and/or any other entity in the distribution chain of goods or services. For example, a merchant may be a retail store, a dispensary, an entity that sells a regulated product or provides a regulated service, an agency, a service provider, an on-line merchant and/or the like.

Terms such as "transmit," "communicate" and/or "deliver" may include sending electronic data from one system component to another over a network connection. Additionally, as used herein, "data" may include information such as commands, queries, files, digitized image, audio or video data, data for storage, and/or the like in digital form or in any other form. In various embodiments, data may be formatted in accordance with any protocol or standard (e.g., HTTP, HTML, etc.)

A "transaction" may include one or more approved authorizations. Moreover, the phrase "transaction data" may comprise data associated with one or more transactions. In various embodiments, an authorization may be approved by a payment processor and/or electronic payment service in response to a transaction request, which may be initiated by a consumer and/or a merchant.

A "regulation" may include one or more regulations, rules, laws, statutes, ordinances, processes, requirements, limits, and/or thresholds of any jurisdiction, governing body, association and/or authority. A regulation may be a single rule or a set of related rules and requirements with mandated processes and procedures.

Phrases and terms similar to "item" may include any good, service, information, experience, data, content, access, benefit, right, reward, points, coupons, credits, monetary equivalent, anything of value, something of minimal or no value, offer, suggestion, merchant, type of merchant, demographic data, preference data, consumer profile data, consumer profile, type of transaction account, transaction account, period of time (e.g., a period of time a consumer has been a customer of a service establishment), and/or the like. In various embodiments, an item may comprise a regulated items in a type of regulated good.

An "offer," "promotion," or "suggestion" may comprise any data and/or information. An offer may comprise one or more items. In addition, an offer may comprise data associated with one or more items. An offer may further comprise one or more characteristics or metadata. The characteristics or metadata associated with an offer may describe one or more attributes associated with the offer, such as for example, pricing, discount, eligibility, exclusions or expiration data. Further, in various embodiments, an offer may comprise an offer to purchase good or service offered for sale by a merchant or SE. Similarly, in various embodiments, an offer may be associated with a merchant or SE.

A "channel" may include any system or method for delivering content and/or the content itself. The content may be presented in any form or medium, and in various embodiments, the content may be delivered electronically and/or capable of being presented electronically. For example, a channel may comprise a website, a uniform resource locator ("URL"), a document (e.g., a Microsoft Word document, a Microsoft Excel document, an Adobe pdf document, etc.), an "ebook," an "emagazine," an application or micro-application (as described herein), a mobile device graphical notification (e.g., a banner or badge), a text message, an email, and/or the like. In various embodiments, a channel may be hosted or provided by a data partner. Further, in various embodiments, a channel may comprise a social media channel, such as FACEBOOK, LINKEDIN, TWITTER, and/or the like.

A "consumer profile" or "consumer profile data" may comprise any information or data about a consumer that describes an attribute associated with the consumer ("consumer attribute") (e.g., a preference, an interest, demographic information, personally identifying information, and/or the like). In various embodiments, a consumer profile may be based upon a variety of data. For example, a consumer profile may be based upon data that is received, culled, collected, and/or derived from a variety of sources, such as a consumer's transaction history, a consumer's online activity, data associated with or available via a consumer's social networking profile (e.g., a consumer's FACEBOOK profile), data associated with a customer's physical location, and/or other publicly and/or privately available sources of information about a consumer. In various embodiments, a consumer profile may not be based upon such data, unless a consumer opts in or requests that such data be used.

Further, in various embodiments, a consumer profile may be based upon data contributed by a consumer, a merchant, a third party, and/or an SE (as described herein). Such data may comprise, for example, a consumer's personal information, e.g., demographic information, a consumer's date of birth, a consumer's residence information, an address of the consumer's work, a specific preference associated with the consumer (e.g., a preference for a certain type of vacation, such as a preference for a tropical vacation), a website in which the consumer is interested, and/or the like. Further, a consumer may contribute data towards a consumer profile by way of a form and/or questionnaire, such as, for example, a web-based form or questionnaire.

With further regard to the types of data which may be contributed to a consumer profile, in general, any information that a consumer would like to serve as a basis for a consumer profile may be contributed. For instance, a consumer profile may comprise location data (e.g., data associated with a global positioning system, a home address, data about a consumer's most visited or favorite places), data associated with a consumer's favorite websites, digital destinations or services (e.g., blogs, news websites, shopping websites, music subscription services, video subscriptions services, video game preferences or usage etc.), personal data (e.g., email addresses, physical addresses, phone numbers, age information, income information, prescription data, medicinal, herbal or recreational usage data, etc.), data associated with a consumer's status or mode of travel (e.g., vacation data, lodging data), data associated with a consumer's favorite items (e.g., food, restaurants, groceries, electronics, music, gaming, clothing types, hobbies, fitness, etc.), and/or the like.

In addition, in various embodiments, a consumer profile may include online tracking cookie data, web beacon data, web tracking data, web packet trace data, digital fingerprint data, clickstream data, purchase or transaction history data, data entered by a consumer in a web based form, data purchased by a merchant about a consumer, social networking data, banking and/or credit card data, stock keeping unit ("SKU") data, transactional and/or budget data, coupon data, retail data (e.g., items purchased, wish lists, etc.), data from third party personal data aggregators, search engine data, and/or any other data which the merchant may have in its possession or to which the merchant may gain access.

Phrases and terms similar to "account," "transaction account," "customer number," "account code," and/or "consumer account" may include any account that may be used to facilitate a transaction (e.g., a purchase of a good or service), offer an item, or associate data with a consumer. These accounts may include any device, code (e.g., one or more of an authorization/access code, encrypted code, QR code, hash code, one-time use code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system.

In various embodiments, a system may be configured to control the remote dispensing of a retail product and/or controlled substance from an onsite centralized control unit or dispensing device, where the dispensing of the item may be contingent on an authorized agent's validation of eligibility criteria, validation of payment, and authorization to dispense to only the same individual whose electronic metadata revealed during the identification scanning process is temporarily available as part of the process that initializes a user's digital order form. In various embodiments, systems and methods may be configured to, upon an acceptable form of identification being scanned by the product dispensing apparatus' peripheral hardware and deemed authentic, generate a digital order form on a remote monitor that provides an authorized agent of a licensed retail and/or medicinal facility complete control of authorizing the dispensing of the controlled substance from a secure, physical location that is both restricted in its access to approved or authorized members of the general public and customers, as well as limited in its access by only the facility's appointed agents. In various embodiments, a system is provided that may comprise a web application and supporting hardware that, as a peripheral system, can control different product dispensing apparatus or vending machine manufacturer designs as a means of dispensing prepackaged controlled substances. In various embodiments, controlled substances can comprise cannabis products. In various embodiments, a system can be configured to provide for dispensing controlled substances in a manner that is fully compliant with prescribed regulations.

Accordingly, and with reference to FIG. 1, an exemplary distribution system 100 for distributing a good (e.g., a regulated item) to a consumer is disclosed. In various embodiments, the distribution system may automate or partially automate activities that are regulated. In various embodiments, while system 100 may facilitate and optimize certain activities or process steps, regulations may mandate that certain other activities or process steps be performed manually by a person (e.g., human agent of a merchant). Thus, system 100 and the various methods disclosed herein, enable realization of the benefits of automation (as disclosed herein) while also enabling compliance with laws, regulations and rules that may prohibit certain aspects of a transaction or customer interaction to be performed in an automated manner. In various embodiments, a distribution system 100 may comprise, a user 101, a distribution device 102, a network 110, a computing device 112, regulatory system 124, a CRM system 122, an AI system 126, a merchant system 120 and a distribution system 132.

System 100 may include or interface with any accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

User 101 may include any user, person, entity, software, hardware, machine and/or combination of these. In various embodiments, a user 101 may be an agent authorized or credentialed to conduct and assess compliance with regulations for regulated goods and/or particular regulated items in a class of regulated goods. In various embodiments, an agent may use a computing device 112 (as disclosed herein) that is configured with a distribution system 132 or distribution module 133 (as disclosed herein). In various embodiments, a user 101 may be an employee of a merchant that uses system 100 for administrative, maintenance or customer relationship management functions. In various embodiments, a user 101 may be a consumer that accesses certain functions and features of distribution system 132 via a micro-app ("app") or web page. A consumer may also access the functions of distribution system 132 via distribution device 102.

A network 110 may include any electronic communications system or method which incorporates hardware and/or software components (e.g. a "cloud" or "cloud computing" system, as described herein). Communication among parties via network 110 may be accomplished through any suitable communication channels, such as, for example, a telephone network, an extranet, an intranet, Internet, point of interaction device (point of sale device, personal digital assistant (e.g., IPHONE, tablet, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system 100 is described herein as being implemented with TCP/IP communications protocols, the system may also be implemented using IPX, APPLETALK, IP-6, NetBIOS, OSI, any tunneling protocol (e.g. IPsec, SSH), or any number of existing or future protocols. If network 110 is in the nature of a public network, such as the Internet, it may be advantageous to presume network 110 to be insecure and open to eavesdroppers. Specific information related to the protocols, standards, and application software utilized in connection with the Internet is generally known to those skilled in the art and, as such, need not be detailed herein.

The various system components may be independently and separately or collectively suitably coupled to network 110 via data links which include, for example, a connection to an Internet Service Provider (ISP) over the local loop as is typically used in connection with standard modem communication, cable modem, Dish networks, ISDN, Digital Subscriber Line (DSL), or various wireless communication methods. Moreover, this disclosure contemplates the use, sale or distribution of any goods, services or information over any network having similar functionality described herein.

As used herein, a "cloud" or "cloud computing" may describe a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing SP-800-145 available at https://csrc.nist.gov/publications/detail/sp/800-145/final (last visited December 2018), which is hereby incorporated by reference in its entirety.

A computing device 112 may include any computing unit or system and may take the form of a computer or set of computers, although other types of computing units or systems may be used, including tablets, laptops, notebooks, hand held computers, personal digital assistants, cellular phones, smart phones, set-top boxes, workstations, computer-servers, main frame computers, mini-computers, PC servers, pervasive computers, network sets of computers, personal computers, such as IPADs, IMACs, and MACBOOKS, kiosks, terminals, point of sale (POS) devices and/or terminals, televisions, GPS receivers, in-dash vehicle displays, and/or any other device capable of receiving data over a network. A computing device may include any device (e.g., a personal computer, a mobile communications device, and/or the like) which communicates via any network, for example such as those discussed herein. Computing device 112 may include software configured to communicate over network 110 and may include one or more browsers or browser applications and/or application programs, including browser applications comprising Internet browsing software installed within a computing unit or a system to conduct online transactions and/or communications. For example, in various embodiments, a computing device 112 may include (and run) MICROSOFT INTERNET EXPLORER, MOZILLA FIREFOX, GOOGLE CHROME, APPLE SAFARI, and/or any software package available for browsing the Internet.

The computing unit of the computing device 112 may be further equipped with an Internet browser, protocol or service configured to connect to the Internet. Transactions originating at a computing device 112 may pass through a firewall in order to prevent unauthorized access from users of other networks. Further, additional firewalls may be deployed between the varying components of system 100 to further enhance security.

In various embodiments, a computing device 112 may or may not be in direct contact with an application server. For example, a computing device 112 may access the services of an application server through another server and/or hardware component, which may have a direct or indirect connection to an Internet server. For example, a computing device 112 may communicate with an application server via a load balancer and/or a web server. In various embodiments, access is through a network or the Internet through a commercially-available web-browser software package.

A computing device 112 may further include an operating system (e.g., WINDOWS, iOS, UNIX, Linux, SOLARIS, Ubuntu, Windows 10 IoT Core, RISC OS, MACOS, and/or the like) as well as various conventional support software and drivers typically associated with computers and computing devices. A computing device 112 may be in a home or business environment with access to a network (e.g., wifi). A computing device 112 may implement security protocols such as Secure Sockets Layer (SSL) and Transport Layer Security (TLS). A computing device 112 may further implement several application layer protocols including http, https, ftp, and sftp.

Figure 2:
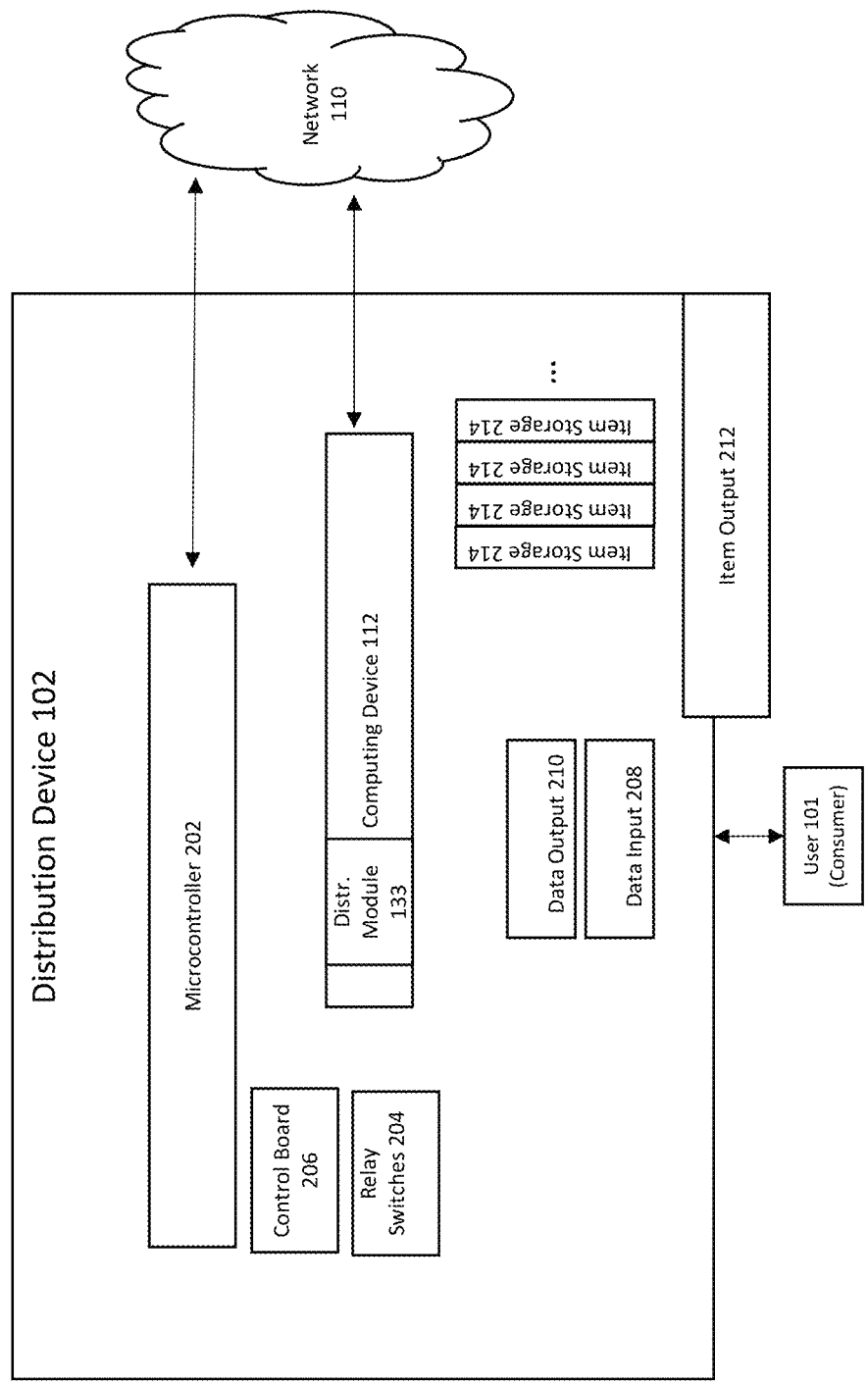
FIG. 2 shows an exemplary distribution device, in accordance with various embodiments.

With reference again to FIG. 1, distribution device 102 may comprise hardware and/or software configured to provide automated or semi-automated distribution of goods and execute processes or procedures in compliance with regulations governing the goods. With reference now to FIG. 2, in various embodiments, distribution device 102 may comprise a microcontroller 202 and/or a computing device 112 configured to execute machine instructions or program code, such as, for example, distribution module 133. In various embodiments, distribution device 102 may be vending machine, vending device or other electro-mechanical device with a control board 206, relay switches 204, a plurality of item storage 214 internal spaces configured to store items and an item output 212 configured to receive items from item storage 214 and distribute items to a consumer. For examples of vending machines known in the art, see for example the distribution devices and vending machines disclosed at https://americangreen.com/ and at https://greenboxrobotics.com. Devices and software disclosed herein enable process automation, wireless control, supervision and authorization functions not present in general service vending machines. The present invention enables hardware vendor independence for automation, control and interoperability of distribution devices and systems that are agnostic to a particular hardware manufacturer.

Distribution device 102 may further be configured with hardware and software for receiving data input, providing data output, controlling the mechanical functions of the device, processing program logic, and/or the like. In various embodiments, distribution device 102 is a vending device with a keypad entry and/or a touchscreen for data input and output. In various embodiments, a general service vending device may be configured, as illustrated in FIG. 2, with a microcontroller 202. Microcontroller 202 may be configured to communicate over a network and/or access various web services. Microcontroller 202 may be further programmed to execute instructions to translate commands or information into electro-mechanical signals and send the signals to a control board of a vending machine in order to enable remote control and operation of the vending machine functions (e.g., set payment, dispense, return error codes, and/or the like). In various embodiments, the microcontroller 202 may comprise a hardware serial input, a linux console, a memory and a processor. In various embodiments, microcontroller 202 may be an Arduino Yun or a Blackberry Pi. In various embodiments distribution device 102 may further be configured with a computing device 112 which may execute programs such as distribution module 133. In various embodiments, microcontroller 202 and/or computing device 112 may not be present in a distribution device 102. For example, in an embodiment, machine code may be implemented to replace the function of the microcontroller.

Figure 3:
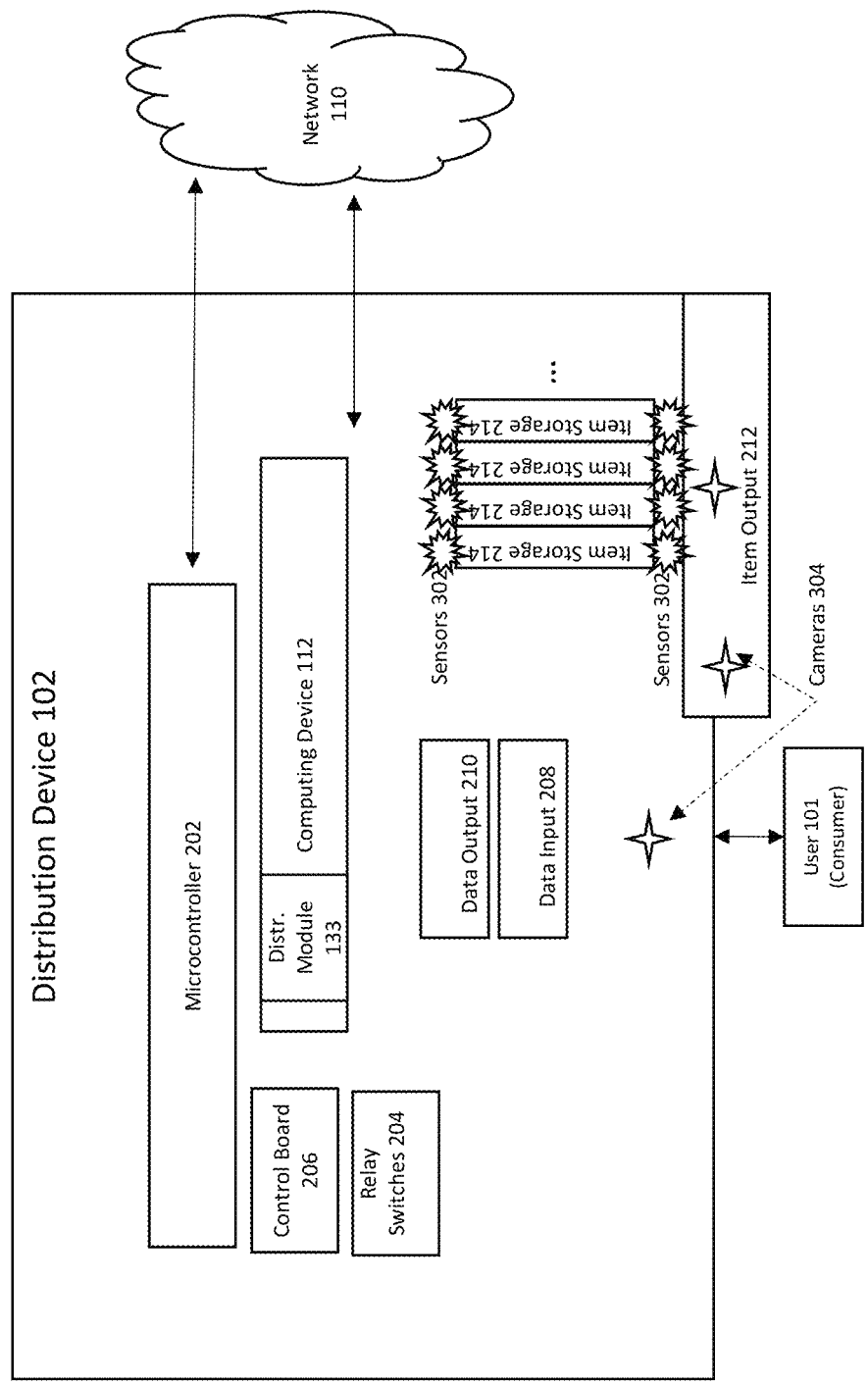
FIG. 3 shows an exemplary distribution device configured with sensors and/or cameras, in accordance with various embodiments.

With reference now to FIG. 3, a distribution device 102 with sensing capabilities is illustrated. In various embodiments, distribution device 102 may be configured with one or more sensors 302 and/or cameras 304. Sensors 302 and cameras 304 may collect data for security and reporting purposes. In various embodiments, sensors 302 may be any combination of heat, pressure, light or motion sensors. In various embodiments, sensors 302 may be an electronic sensor or an RFID reader configured, for example, to sense the location of a product in distribution device 102. In various embodiments, cameras 304 may be configured and/or positioned to provide images or video regarding the location or disposition of items in distribution device 102. In various embodiments, cameras 304 may provide information on the condition of parts or the presence of foreign objects in distribution device 102. Sensors 302 and cameras 304 are configured to send collected data to other systems and devices of system 100 by, for example, using the networking capabilities of microprocessor 202.

With reference back to FIG. 2, merchant system 120 may comprise hardware and/or software for storing and processing data related to a merchant's business or operations. For example, in various embodiments, merchant system 120 comprises one or more of a point-of-sale system, an inventory system, a pricing system, a transaction database, an accounting system, a human resources system, a payments system, and/or a reporting system.

Regulatory system 124 may comprise hardware and/or software for storing and processing data related to regulations (as defined herein). Regulatory system 124 may include a database, program logic, interfaces, a process engine and interconnection with any system, device or program disclosed herein. Regulatory system 124 enables compliance with regulations for any geography, jurisdiction, item, regulated good, product category, merchant, consumer, equipment, day, time, or other attribute or parameter used in defining a jurisdiction. As such, in various embodiments regulatory system 124 enables efficient and universal compliance with regulations. In various embodiments, regulatory system 124 includes a process engine that enables multiple regulatory procedures and requirements and any concomitant steps and/or sequence of operations. In various embodiments, regulatory system 124 includes a compliance reporting function for reporting regulated activity for any regulation across jurisdictions and for any regulatory or rule making authority.

Distribution system 132 may comprise hardware and/or software for storing, receiving and processing data related to the distribution of goods and services (as defined herein). Regulatory system 124 may include a database, program logic, interfaces, a process engine and interconnection with any system, device or program disclosed herein. In various embodiments, distribution system 132 may be configured to be agnostic to the merchant, location, inventory or regulations related to the items being distributed. For example, distribution system 132 may receive data from any system (e.g., regulatory system 124) regarding programmatic logic, steps, interfaces or data and distribution system 132 may execute instructions, present and receive data, format and present interfaces, send and receive messages, control devices, etc. based upon the data received from other systems.

Figure 8:
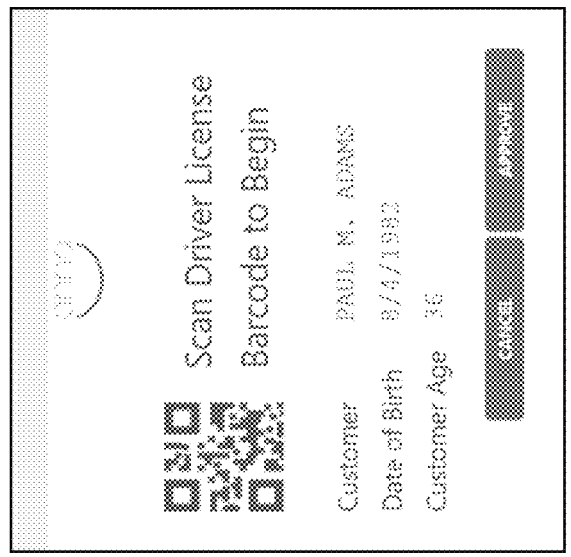
FIG. 8 shows a screen shot of an exemplary user interface of a distribution system.
Figure 9:
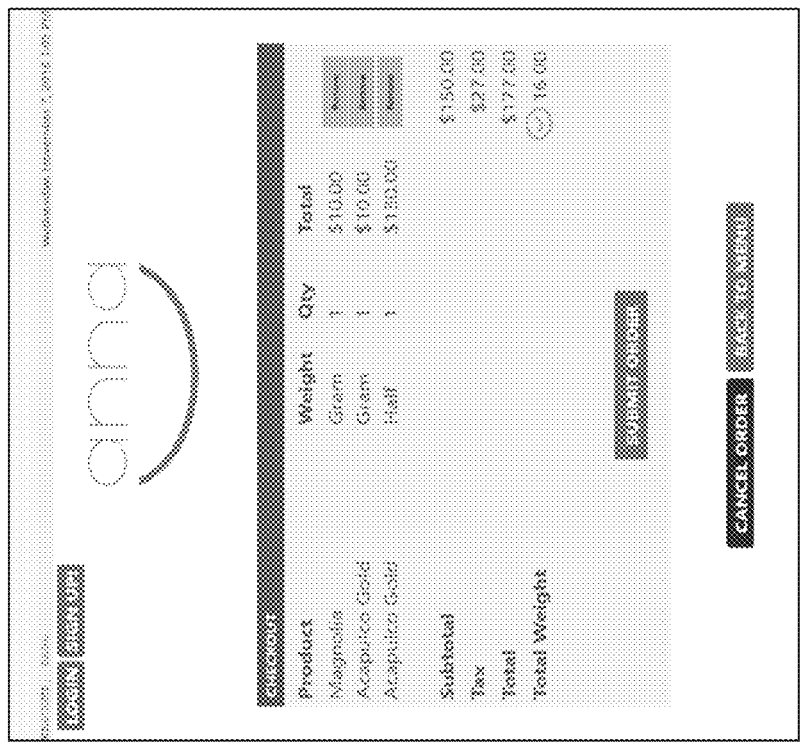
FIG. 9 shows a screen shot of an exemplary user interface of a distribution system.
Figure 10:
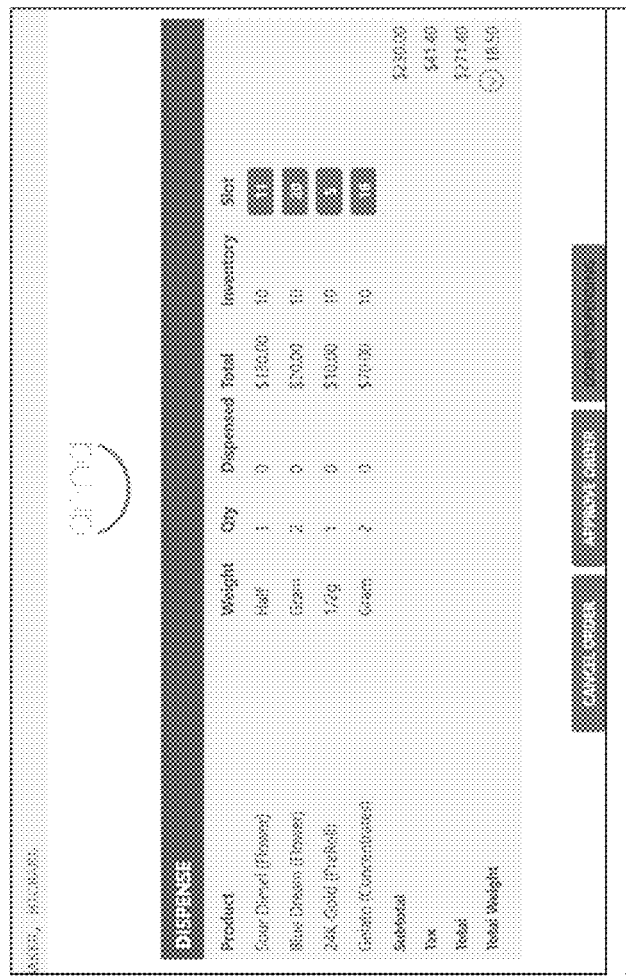
FIG. 10 shows a screen shot of an exemplary user interface of a distribution system.

Distribution module 133 may comprise any software that includes all or a subset of the functions of distribution system 132. For example, distribution module 133 may be an application or app on a consumer's device (e.g., a smart phone) and configured to receive suggestions for items to be purchased and to initiate purchases of such items (as described herein). In various embodiments, distribution module 133 may be a program, application or app on a computing device 112 (e.g., a tablet computer) and configured to present agent interfaces for the control and administration of a regulated distribution process. In various embodiments, distribution module 133 may be a program or application on a computing device 112 of distribution device 102. FIGS. 8-10 show examples of interfaces, in various embodiments, of distribution system 133.

CRM system 122 may comprise hardware and/or software for storing and processing data related to the distribution of items, goods and services (as defined herein). CRM system 124 may include merchant databases, consumer databases, consumer profiles, purchase and/or transaction history, product databases, suggestion databases (e.g., promotions, offers, vouchers and the like), program logic, interfaces, a process engine and interconnection with any system, device or program disclosed herein. In various embodiments, CRM system 124 stores, accesses, processes or creates any information related to a merchant's business. For example, in various embodiments CRM system 122 provides input to AI system 126 and receives output from the artificial intelligence and other analytic and predictive features of AI system 126 regarding suggestions that may be tailored to customers, merchants, items and/or a combination of any of these. In various embodiments, CRM system 122 may be configured to push notifications through a mobile application to a consumer as a scheduled event or an ad hoc event performed in response to an input from an authorized agent. Age-eligibility of a mobile application user and/or push notification recipient can be verified using various techniques such as age-gating, passcode authentication, biometric authentication, image recognition authentication, and the like. A passcode authentication procedure can be configured so that customers are provided with a unique access code to follow the store on the mobile application. This procedure may enable a store to monitor and control follower volume. In various embodiments, CRM system 122 may be configured to provide for an ability of an authorized agent of an establishment licensed to sell controlled substances, through either or both retail and medicinal means, to advance schedule or send on command advertisements, licensed through a 3rd party web application, to registered users that are within a predetermined geographic radius of the product dispensing apparatus and its integrated peripheral hardware and software, enabling the machine to self-promote to a registered user base within said geographic radius.

AI system 126 may comprise hardware and/or software for developing strategies, suggestions, intelligence and other data to enhance a consumer experience, promote products, optimize merchant operations or profitability, increase market share, and the like. In various embodiments, AI system 126 may implement artificial intelligence, big data analytics, statistical methods and similar forecasting and modeling techniques. For example, in various embodiments, a suggestion for an item may be tailored to a consumer based on a forecast of a merchant's needs, such as over- or under-supply of items, promotions and/or incentives offered by suppliers, item margins, inventory spoilage information, and the like. In various embodiments, an item may be tailored to a particular consumer based upon a rule or a strategy developed or learned by artificial intelligence (AI). For example, items may be promoted by way of suggestions based AI of any data disclosed herein. For example, AI system 126 may develop an understanding of certain dynamics of consumer and/or a market for a particular item and develop suggestions related to, for example, the fact that a holiday is approaching, a particular type of news or event is occurring, that it is a particular time of day, that the consumer is traveling, that the item is associated with a merchant who is some distance away, that the consumer listened to a certain type of music, made a particular purchase or viewed a type of content, etc.

In various embodiments, CRM system 122 and AI system 126 interactively or iteratively develop or curate, packages (i.e., groupings or offerings) of items that may be of interest to a consumer. CRM system 122 may formulate curated programs targeted at a particular type of consumer or an individual consumer. In various embodiments, the curated suggestions are developed and scheduled to be pushed to consumer on a defined schedule and in some embodiments, curated suggestions are developed dynamically over time and based upon changing information.

Referring broadly now to FIGS. 4-10, the process flows, logical representations, and/or screen shots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 4-10 but also to the various system components and/or logical representations as described above with reference to FIGS. 1-3. In addition, although FIGS. 4-10 may variously utilize and make reference to one or more matrices, tables, and/or the like, it will be appreciated that a variety of data structures, data sets, and/or the like may be substituted and/or utilized with equal application to the process flows, logical representations, and/or screen shots depicted and discussed herein.

Figure 4:
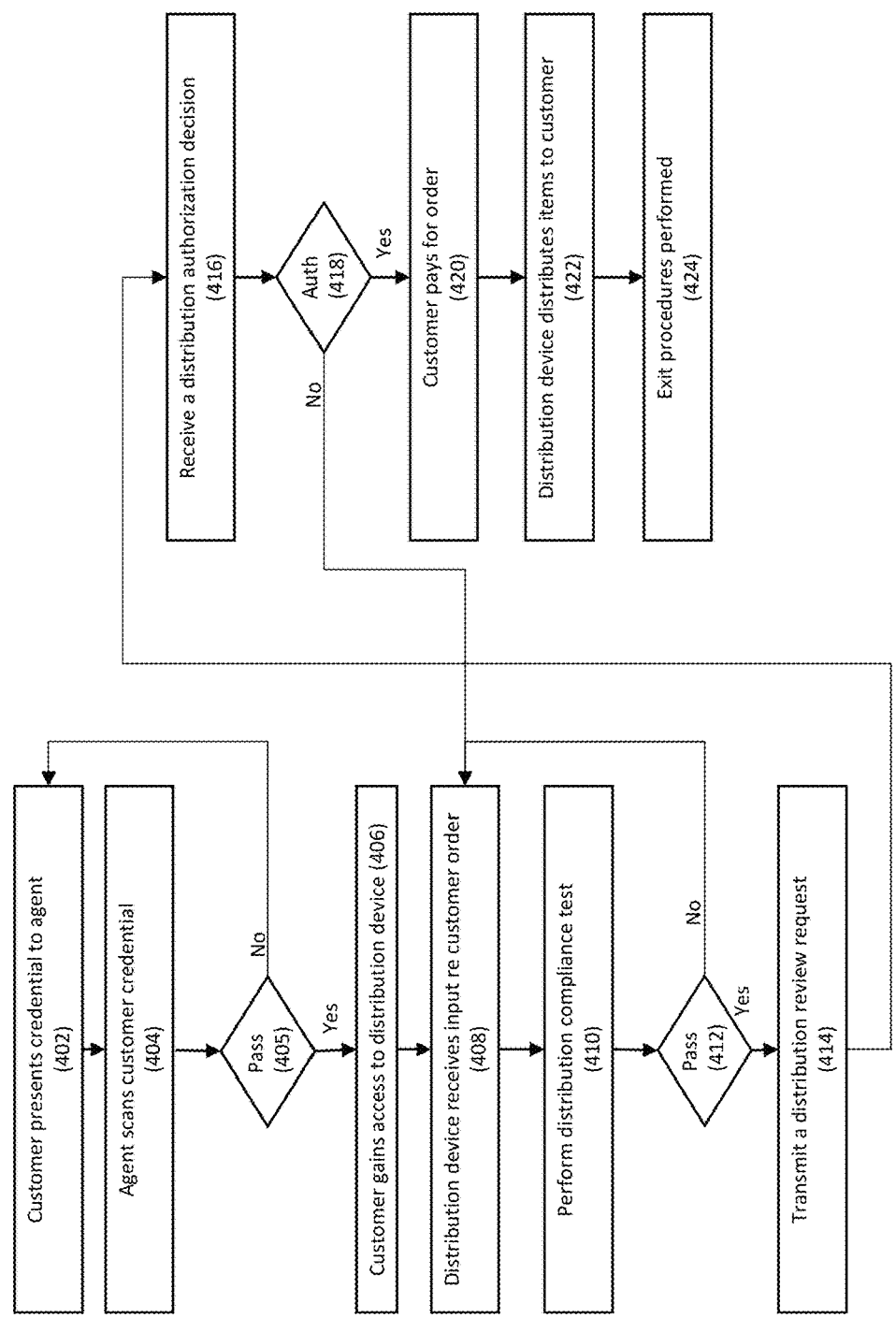
FIG. 4 shows a flowchart depicting an exemplary process for compliant distribution of a regulated item.

With reference to FIG. 4, a process 400 for distributing a regulated item to a consumer is shown. In various embodiments each of the steps may be performed alone and/or in combination with any other step. Accordingly, as shown, in various embodiments, a customer may enter a merchant and a present a credential to an agent for verification (step 402). A credential may be, for example, a state issued driver's license or other identification, a medical prescription card, or the like. In various embodiments, a regulation governing a type of goods sold by the merchant specifies the type of identification and the verification test or rule that is to be used by the agent. In various embodiments, a regulation governing a type of goods sold the agent requires that the consumer present credentials to a person (i.e., a live human); for example, an agent of the merchant that is trained, licensed or otherwise authorized to receive customer credentials and make a determination of whether the customer is authorized to shop for, view and/or purchase certain goods available at the merchant location.

In various embodiments, a regulation may require that a consumer be of a certain age to shop for and/or purchase a certain type of goods and/or a regulation may require that a consumer be a legal residence of a certain state, county or other geographic area or jurisdiction to shop for and/or purchase a certain type of goods. In various embodiments, a regulation may require that the customer present a credential as a requirement for entering the physical premises of the merchant establishment and present the same or different credential a second time in order to shop for certain regulated goods in an automated or semi-automated manner such as using distribution device 102 (as described herein).

In various embodiments, the agent scans the credential using a computing device 112 (step 404). In various embodiments, making a determination of whether the customer is authorized to shop for, view and/or purchase certain goods available at the merchant location is performed by a person and is also subject to a systematic verification. For example, the scanned credential data may be used as input into distribution system 132 or a module, subroutine or app (e.g. distribution module 133) comprising the distribution system 132 logic and the and the logic may be executed by a computing device 112 in combination with regulation data or rules from regulatory system 122, to determine that the customer is authorized to shop for, view and/or purchase certain goods available at the merchant location. FIG. 8 depicts an exemplary notification that may appear on an agent interface of distribution module 133; for example, the depicted notification may appear on an app which may be installed on a tablet operated by the agent. In various embodiments, regulations may not require physical, hard verification of a credential by a person and for example, credential verification may be instead performed by scanning the credential at distribution device 102.

With further reference to FIG. 4, in various embodiments, the system and/or the agent determines whether the customer is authorized to shop for, view and/or purchase certain goods available at the merchant location (step 405). A customer may be denied access based upon, for example, a determination that the credential has expired, the consumer has been temporarily blocked from shopping for the goods and/or if are regulation regarding the good is not in compliance; an example of non-compliance may be that the distribution system 132 determines that an accumulator has reached or surpassed a limit for purchase of a type of good (e.g., consumer is only authorized to purchase an ounce of cannabis product during any calendar day).

In various embodiments, the agent determines a distribution device 102 to assist the customer in the ordering and/or fulfillment of goods. The agent may determine a distribution device 102 from a plurality of distribution devices available at the merchant location using manual means (e.g., personal choice) or distribution module 133 may determine a distribution device 102 by executing logic to determine a distribution device based upon a variety of factors. For instance, certain distribution devices may be configured to distribute different types of products and/or distribution system 133 may maintain service time and queuing data and determine a distribution device for the customer based upon minimizing customer wait times. In various embodiments, the distribution device 102 receives data from distribution module 133 indicating that the customer is authorized to access the distribution device 102. For example, in an embodiment, distribution module 133, which may be running on the agent's computing device 112, encrypts the credential data scanned from the customer's credential and sends an encrypted code to the distribution device 102. In various embodiments, computing device 112 may access distribution system 132 and distribution system 132 may access a secure encrypted hash table or an encryption function and determine an encrypted hash code to associate with the customer. In various embodiments, customer accesses distribution device 102 by scanning a credential or entering an assigned PIN using the distribution device input hardware which may comprise for example, a scanner, keypad, touchscreen, etc. (step 406).

In various embodiments, the customer shops for and indicates one or more items selected by the customer (step 408). In various embodiments, a customer may use a variety of means, interfaces and input mechanisms to create a customer order. In various embodiments, as discussed herein, a customer may use an app of the merchant to shop for and configure an order for distribution by the merchant and access the order details at the distribution device. For example, a customer may enter an account number or PIN or scan a voucher or a code (e.g. a QR code, one-time use code, etc.) at the distribution device 102 and a shopping cart or customer order form may be pre-populated and displayed to the customer at distribution device 102. It will be appreciated that in various embodiments, a PIN or code may be used by a customer to indicate an order may be a one-time use code such as for a code communicated to a customer by CRM system 122 associated with a particular promotion, discount or indicating pre-configuration of or pre-payment for an order. In various embodiments, distribution device 102 may determine a customer order based upon information received by the distribution device 102 from distribution system 132 or distribution module 133 during the assignment of the distribution device 102 to the customer. For example, distribution device 102 may retrieve a customer order from a database of merchant system 120 and/or of CRM system 122. In various embodiments, such pre-population of a customer order by the distribution device may be based upon explicit input by a customer, for example, using an app. In various embodiments, such pre-population of a customer order by the distribution device may be based upon a suggestion determined by CRM system 122 (e.g., based upon purchase history or other factors) and retrieved automatically by the distribution device 102. In various embodiments, a customer shops for items at the distribution device 102 using input and output hardware of the distribution device. For example, distribution device 102 may have a data output 210 comprising a video display and a data input 208 comprising a keypad. In various embodiments, a touchscreen may perform the function of both a data output 201 and a data input 208.

In various embodiments, distribution device 102 performs a distribution compliance test (step 410). In various embodiments, the distribution device 102 is configured to access distribution logic to be executed, for example, by distribution module 133 and/or distribution system 132 and configured to assess the customer order for compliance with regulations. In various embodiments, distribution logic includes steps to access regulations associated with the customer order. As discussed herein, regulatory system 122 may be configured to access regulatory data from a plurality of jurisdictions, a plurality of licensing regimes and license types and for a plurality of items and, in various embodiments, compliance with regulations may include a plurality of rules or no rules, executed in an order defined by processes stored in regulatory system 122. For example, in various embodiments a rule is associated with attributes of items found in a customer order. Such attributes may include, for example, a weight or mass of an item, a concentration or potency of an item, a type, category or classification of an item, a consistency or state an item, and/or a purchase history associated with the consumer and various items. For example, in an exemplary embodiment, a state regulates distribution of cannabis and a regulation limits the amount (e.g., weight) that may be distributed to a consumer within a given timeframe. For example, a state may allow for distribution of up to one ounce of cannabis items per day and distribution module 133 may execute logic to determine the cumulative weight of the items in a customer order. In various embodiments, distribution module 133 may access CRM system 122 and retrieve a purchase history for the customer. Distribution module 133 may determine the cumulative weight of items or a cumulative amount of an active ingredient in various items of a customer order and combine that data with similar data from previous customer purchases (e.g., transactions stored in the system for purchases that may have occurred on the same day but in a different location). In various embodiments, distribution module 133 may be configured with an accumulator to calculate the total amount of product being purchased and/or may be configured to determine that an amount of product being purchased does not exceed purchase limits, whether for a singular transaction, a calendar day, or some other time period. In various embodiments, while a digital order form is queued and its submission pending, a preconfigured accumulator may limit the total amount of products ordered. No order submission, whether through prepaid voucher or onsite purchase, is allowed to exceed the specified accumulator limit. In various embodiments, the total amount of products ordered can be calculated or determined using a variety of criteria alone or in combination, including product number, product mass, product type, total quantity of one or more ingredients or analytes, and the like. FIG. 9 depicts an exemplary interface of distribution module 133 that may communicate information regarding compliance with a regulation to the consumer. For example, the notification depicted in FIG. 9 may appear on a display of distribution device 102.

In various embodiments, distribution device 102 may receive data indicating that one or more regulations is violated by an item or a combination of items in a customer order and not allow the customer to continue with distribution of the order (step 412). In various embodiments, distribution device 102 is configured to prompt the customer to edit the customer order. In various embodiments, distribution device 102 is configured to determine one or more alternative items that may be in compliance with regulations and suggest an alternative order to the customer.

In various embodiments, distribution device 102 may receive data indicating that the customer order is in compliance with applicable regulations (step 412). In various embodiments, distribution device 102 transmits a distribution review request to an agent to perform manual review and verification of a customer order (step 414). An agent may receive the distribution review request on an app running on a computing device 102. In various embodiments, the app presents data regarding the regulation and the items and attributes of the customer order on an interface for the agent to review. For example, an in various embodiments, an agent may be presented with matrix of data showing the mass of each item in customer order along with data indicating purchases within a particular time frame of the same or similar items governed by the same regulation. Further the display may indicate to the agent a series of calculations (e.g., cumulative weight) combining or comparing attributes of the items and assessing whether the order is in compliance with regulations. FIG. 10 depicts an exemplary interface of distribution module 133 that may communicate information regarding compliance with a regulation to the agent. For example, the notification depicted in FIG. 10 may appear on a display an agent device configured to run distribution compliance and control software (e.g. distribution module 133).

In various embodiments, the agent makes a distribution decision and transmits a distribution authorization decision to distribution device 102. Distribution device 102 receives the distribution authorization decision (step 416). In various embodiments, if the distribution is not authorized, the distribution device may suggest an alternative order, prompt the user for alternative order input, and/or terminate the user session without distribution of any product. In various embodiments, if the distribution is authorized by the agent then the distribution process continues (step 418).

In various embodiments, distribution device 102 is configured to receive customer electronic payment data, for example, such as transaction account information, customer account information (step 420). In various embodiments distribution device 102 communicates and coordinates electronic payments with merchant system 120. In various embodiments, distribution device 102 is configured to receive physical payment (e.g. tangible money) and completes the payment process with the customer. In various embodiments, distribution device may be configured to print an itemized receipt of the transaction for the customer. In various embodiments, a receipt may be transmitted the customer via email or made available in an app.

In various embodiments, distribution device 102 distributes the items in the customer order (step 422). In various embodiments, distribution device is a vending machine and microcontroller 202 receives a distribution message to distribute an item or items. The microcontroller converts the message to an electromechanical command and causes the mechanical instrumentation of the vending machine to move items of the customer order from item storage 214 to the customer via item output 212.

In various embodiments, regulations may dictate that a person (e.g. a live human agent) verify the items distributed to the customer by distribution device 102. In an exemplary embodiment, the customer gathers the items and proceeds to the agent. Distribution device 102 sends a message with a record of the distribution to the agent on the agent's agent interface on computing device 112. The agent may use the information on the interface to verify the distribution and authorize the customer to exit the facility with the distributed items. In one embodiment, at the authorized agent station, all products may be presented to the authorized agent. At the station, the authorized agent may confirm that the scanned ID matches that of the customer, that all products on the digital order form are accounted for, and that any non-cash/non-voucher form of payment belongs to the customer.

In various embodiments, regulations may dictate that one or more items of a customer order be packaged in an exit packaging (e.g., a bag with certain labeling) for exit out of the physical merchant premises. In various embodiments, exit packaging may be made available at or by distribution device 102. In various embodiments, the customer receives exit packaging from an agent or other employee of the store.

Figure 5:
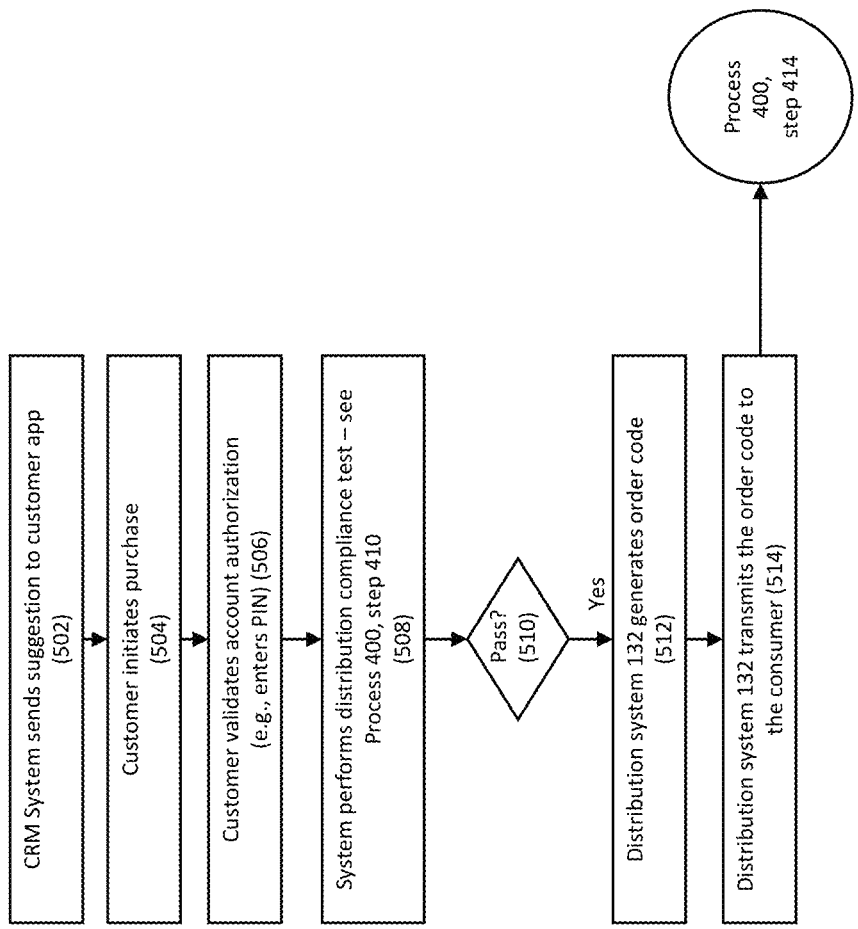
FIG. 5 shows a flowchart depicting an exemplary process for distribution of an item initiated by a push notification to a consumer.

With attention now to FIG. 5, an exemplary process 500 illustrates a process for a suggestion sent, or pushed, electronically to a consumer (step 502). As discussed herein, in various embodiments, the consumer receives a suggestion via one or more apps configured to receive data from CRM system 122. Transmittal of push notifications through a mobile application to a customer can be a scheduled event or an ad hoc event performed in response to an input from an authorized agent. Age-eligibility of a mobile application user and/or push notification recipient may be verified using various techniques such as age-gating, passcode authentication, biometric authentication, image recognition authentication, and the like. A passcode authentication procedure can be configured so that customers are a provided with a unique access code to follow the store on the mobile application. This procedure may enable a store to monitor and control follower volume. In various embodiments, an authorized agent interface, for example an app, may be configured to allow an authorized agent to send on command a push notification to mobile application users who previously elected to follow the store for which the authorized agent represents. In various embodiments, a mobile application may be provided as a free download from participating mobile application sources for consumers who attest that they meet applicable requirements. In various embodiments, mobile application content may only be provided by a vendor. In various embodiments, the mobile application software may be configured to provide for push notifications to be sent to in accordance to vendor-specified criteria. For example, a vendor may select for a push notification to be sent to all of a vendor's e.g. followers, a vendor-specified group of followers, or followers within a particular radius of the peripheral device. In various embodiments, a disclosed herein push notifications may be formulated, initialized scheduled and/or controlled automatically by CRM system 122. Content of a push notification may include general store and/or product advertisements, or promotional sales not otherwise disclosed outside of the store. The promotion may include an option to buy a related voucher, which may then be configured to load a unique digital key to the user's app, allowing him/her to scan the key onsite at the product dispensing apparatus or a peripheral device. In various embodiments, a mobile application user (or follower) who receives an advertisement or promotion may elect to make a purchase, whether in response to a suggestion or making us of another in-app method. In various embodiments, the consumer interface, such as an app, may be configured to require the consumer to input a unique PIN, set up upon registration, to proceed with a purchase. In various embodiments, securing a voucher for a product(s) may or may not require a follower to leave the mobile application and finalize the purchase using a secure web browser. In various embodiments, CRM system 122 may be configured to prevent authorizing too many vouchers for a particular item by reserving and accounting for one or more units of the item in the product dispensing apparatus inventory. In various embodiments, a digital key representing a product voucher may be loaded to a user's mobile application. A digital key may be scanned by a system as an acceptable method of payment prior dispensing of a product by a product dispensing apparatus.

In various embodiments, the consumer may use the functions available in the app to create a new order and/or edit an order that was pushed to the consumer. In various embodiments, the consumer may review a tangible advertisement, such as a flyer or paper ad, and scan a code (e.g., a QR code shown on the tangible advertisement) and thereby import data regarding a suggestion into the consumer app. In various embodiments, a consumer reviews the suggestion and accompanying order items. The customer initiates purchase of an of the order (step 504). In various embodiments, the customer enters an account code (e.g, PIN, password, biometric data, etc.) to authorize a purchase (step 506).

In various embodiments, the app initiates a distribution compliance test for the customer order (step 508). As discussed herein, and particularly disclosed in process 400 (e.g., step 410), in various embodiments, distribution system 132 and regulatory system 122 are configured to perform distribution compliance tests for a customer order. In various embodiments, upon when the distribution system 122 determines that the distribution compliance test has passed (step 510) the consumer may pre-pay for the order using the app. In various embodiments, the app communicates with system 100 and reserves in a merchant's inventory the items from the order. In various embodiments, the app may be associated with multiple merchant locations and the customer order from the app may not be limited to any particular location.

Distribution system 132 generates an order code corresponding to the order (step 512). In various embodiments, the order code may be a one-time use code such as a digital key or token. Distribution system 132 transmits the order code to the consumer (step 514). In various embodiments, the code may be transmitted to a consumer app, to an email account, a social networking account or via a messaging app. In various embodiments, a consumer enters a merchant location and may follow at least a portion of the process illustrated in FIG. 4 and described herein. In various embodiments, the order code may be scanned by an agent at the merchant location. For example, with reference again to FIG. 4, in step 404 an agent scans a credential of the consumer, the agent may also scan any order code that the customer may present to the agent and the order may pre-populate on the distribution device 102 that is assigned to the consumer. In various embodiments, with reference again to FIG. 4 in step 404 an agent scans a credential of the consumer and the system automatically determines an order code associated with the customer based upon the credential and/or an encrypted code (e.g., hash code) determined based upon the credential and the order code is used to retrieve the detailed data of the order on CRM system 122. In various embodiments, as discussed previously herein (see step 410), the consumer may scan the order code using a scanning capability of distribution device 102.

In various embodiments as disclosed above, the regulatory compliance occurs for orders that originate in an app during or prior to the creation of the order code. As such, in various embodiments, an order code is scanned into distribution system 132 at a merchant may not require further automated testing for distribution compliance. In various embodiments, the distribution process proceeds with a distribution review by an authorized agent as disclosed herein (see process 400, steps 414-424).

Figure 6:
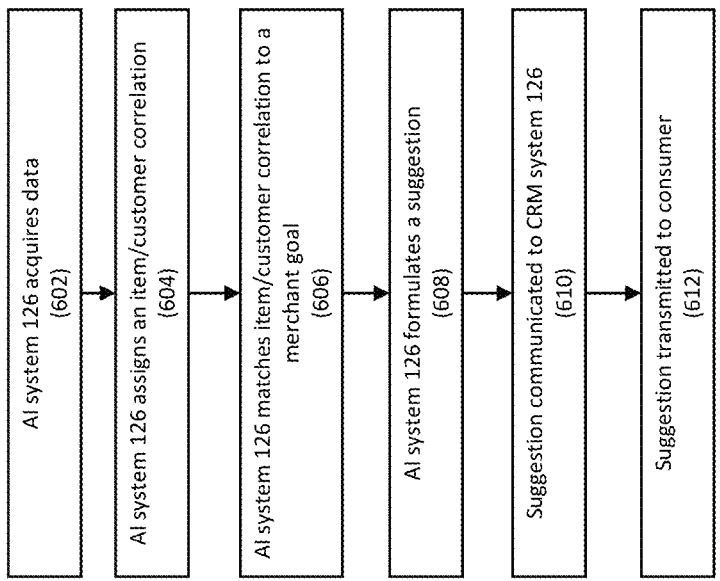
FIG. 6 shows a flowchart depicting an exemplary process for creating a suggestion using an artificial intelligence capability.

With reference now to FIG. 6, a process 600 for developing a suggestion by AI system 126 is shown. AI system 126 may acquire data from multiple data sources regarding the dynamics of a merchant business (step 602). In various embodiments, AI system 126 may acquire consumer profile, a transaction history associated with a consumer, social data (e.g., data associated with a social media channel, such as FACEBOOK, SNAPCHAT, and/or the like), demographic data, consumer feedback data, merchant supply data, merchant goal data, and the like. AI system 126 may run an artificial intelligence algorithm to analyze the collected data and assign a correlation or probability to an item/customer pair (step 604). In various embodiments, an item-customer correlation may identify relevant items based upon a variety of information which may not be directly associated with a customer but may be correlated based upon a machine learning and/or artificial intelligence algorithm. For example, in various embodiments, an artificial intelligence algorithm determines an item-customer correlation based upon at least one of a demographic, a purchase history, a complementary product, a product rating, a consumer location, a social networking attribute, a music service, a video service, a time, a date, a friend associated with the consumer, a promotion, a medical history, a physical characteristic, and a consumer habit. In various embodiments, AI system 126 may match a customer-item correlation with a merchant goal (step 606). For example, a merchant may seek to increase its market share of consumers in a particular age bracket for ingestible (e.g. edible) herbal products and AI system 126 may use big data analytic methods to develop a corresponding merchant goal. In various embodiments, AI system 126 may formulate a suggestion based upon the item-customer pair and the merchant goal (step 608) and communicates the suggestion to CRM system 126 (step 610). In various embodiments, CRM system 126 may transmit the suggestion to a consumer or a group of consumers via any method disclosed herein (e.g., make the suggestion available in the consumer's web app) (step 612).

Figure 7:
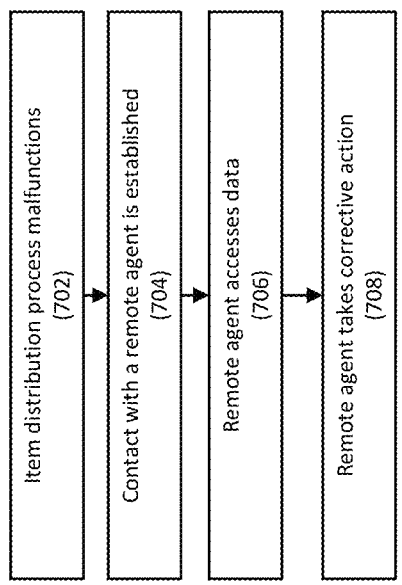
FIG. 7 shows a flowchart depicting an exemplary process for remote support of a distribution device.

With reference now to FIG. 7, a process 700 for remote intervention and control of a distribution process is illustrated. In various embodiments, the process of distributing goods to a consumer may be assisted by a remote agent. For example, during the distribution of an item from distribution device 102 the distribution process may malfunction (e.g., an item may fail to distribute properly) (step 702). In various embodiments, communication between a remote agent and a consumer may be established (step 704). In an embodiment, the distribution device 102 may include signage with information for requesting assistance. For example, the consumer may be provided with a phone number, a website or a method of contacting a remote agent using messaging technology of a network connected device (e.g. a mobile device). In various embodiments, a distribution device 102 uses its internal networking technology (as disclosed herein) to provide a function for a consumer to contact a remote agent. For example, distribution device 102 may have a data input/data output device comprising a touchscreen and the consumer may be presented with an option on the touchscreen to contact remote assistance. In various embodiments, communication with a remote agent may occur via distribution device touchscreen or other display interface. In various embodiments, distribution device 102 may be configured to contact a remote agent automatically if a malfunction is detected. In various embodiments, a remote agent may initiate contact with a consumer, for example via distribution device 102 interface (e.g. touchscreen).

In various embodiments, a remote agent accesses data collected by sensors 302 and/or cameras 304 of distribution device 102 (step 706). For example, cameras 304 may provide a remote agent with visual data indicating a malfunction in the distribution process. In various embodiments, sensors 302 may be configured to provide information of a malfunction to a remote agent. For example, a light sensor may provide data to the remote agent indicating that an item has become stuck in item storage 214 or in a conduit connecting item storage 214 with item output 212. In various embodiments, items for distribution via distribution device 102 may be affixed with a RFID tag or transponder and distribution device 102 may include an RFID reader for detecting the RFID tag and identifying an item that may be stuck in the device. The RFID tag data may be registered and stored in an inventory system in order to account for the precise item that caused the malfunction and/or failed to distribute properly.

In various embodiments, a remote agent may take a corrective action to address a machine malfunction (step 708). For example, a remote agent may verify that an item was not properly distributed to a consumer, initiate a refund to the consumer and/or contact a service technician to service the malfunctioning device. In various embodiments, a remote agent may make use of remote control capabilities of distribution device (as disclosed herein) to perform, for example, one or more of the following corrective actions: disable the malfunctioning distribution device, initiate a distribution of an item on the malfunctioning device, initiate a distribution of an item on functioning device in the vicinity of the malfunctioning device, initiate a mechanical control to clear a physical jam in the machine, etc. In various embodiments, the remote agent may be a person. In various embodiments, the remote agent may be a software program (e.g., a bot). In various embodiments, the agent need not be remote. For example, in various embodiments the functions of the remote agent (as described herein) are executed by a computer program executed on a processor of the distribution device.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers. A user may include any individual, business, entity, government organization, software and/or hardware that interact with a system.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and/or the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any selected data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

For security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and/or the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications protocol, such as the internet. Web services are typically based on standards or protocols such as XML, SOAP, REST, AJAX, WSDL and UDDI. Web services methods are well known in the art, and are covered in many standard texts.

Middleware may include any hardware and/or software suitably configured to facilitate communications and/or process transactions between disparate computing systems.

There are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

The systems and methods may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and/or the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and/or the like. Still further, the system could be used to detect or prevent security issues with a client-side scripting language, such as JavaScript, VB Script or the like.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and/or the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of distributing regulated goods to a consumer, comprising:
    permitting access to a secured location in response to a first agent verifying a consumer is authorized to shop for regulated goods;
    scanning, by a computer-based system comprising a vending device in the secured location, a credential of the consumer to identify credential data including a consumer attribute;
    encrypting, by the computer-based system, the credential data using an encryption function to determine a hash code associated with the consumer;
    transmitting, by the computer-based system, the hash code associated with the consumer to the vending device;
    enabling, by the computer-based system, the vending device to receive a first input from the consumer in response to receiving the hash code, wherein the vending device comprises at least one of a keypad, a touch screen, and a scanner;
    receiving, by the vending device, the first input comprising a first item selected by the consumer, wherein the regulated goods comprise a plurality of regulated items and the plurality of regulated items comprises the first item, wherein the first input comprises at least one of a touch screen entry, a keypad input, a scanned code, or electronically transmitted data from a user interface;
    determining, by the computer-based system, that the first item complies with a first regulation associated with the regulated items in response to an attribute of the first item and an attribute of the consumer comprising a purchase history of the consumer satisfying a rule associated with the first regulation,
    wherein the rule comprises a limit of a cumulative attribute of the regulated items distributed over a period,
    wherein the cumulative attribute comprises at least one of a cumulative weight, a cumulative amount of an active ingredient, and a cumulative amount;
    transmitting, by the computer-based system, a distribution review request to authorize distribution of the first item from the vending device to the consumer;
    receiving, by the computer-based system, a distribution authorization in response to a second input in an agent interface configured to run on a computing device in communication with the computer-based system; and
    distributing, by the vending device, the first item to the consumer in response to receiving the distribution authorization.

2. The method of claim 1, wherein permitting access to the secured location comprises:
    examining by the first agent the credential associated with the consumer to determine that the consumer is authorized to shop for the regulated goods; and
    allowing the consumer to access the computer-based system in response to determining the consumer is authorized to shop for the regulated goods.

3. The method of claim 2, wherein the credential comprises at least one of an identification associated with the consumer and a license associated with the consumer.

4. The method of claim 2, wherein the examining by the agent of the credential comprises determining that at least one of an age of the consumer and a residence of the consumer are in compliance with a second regulation associated with the regulated goods.

5. The method of claim 4, wherein the first regulation and the second regulation are dynamically determined based upon regulation data stored in a regulation data source.

6. The method of claim 5, wherein the regulation data source comprises regulations associated with at least one of a plurality of jurisdictions, a plurality of locations, a license type associated with the location of the vending device, and the regulated items.

7. The method of claim 1, wherein the rule is applied to the first item and a second item.

8. The method of claim 7, wherein the rule is applied to at least one of a cumulative weight of the first item and the second item, a combination of first item and the second item, a cumulative concentration of an active ingredient in the first item and the second item, and a timeframe associated with the purchase history.

9. The method of claim 8, further comprising:
    determining that purchasing by the consumer the first item and the second item violates the rule;
    determining that purchasing by the consumer a third item and the first item satisfies the rule; and
    prompting the consumer to select the third item and discard the second item.

10. The method of claim 1, wherein the vending device is at least one of physically located and physically configured based on a second regulation.

11. The method of claim 1, wherein the receiving the distribution authorization comprises receiving the distribution authorization by the vending device and sending a control signal to a mechanical distribution mechanism of the vending device.

12. The method of claim 11, further comprising dispensing a second item from the vending device to the consumer in response to receiving the distribution authorization.

13. The method of claim 1, further comprising, in response to receiving the distribution review request:
    displaying on a display device and to the second agent, distribution request data associated with the distribution review request,
    wherein the second agent is a person, and
    wherein the distribution request data comprises at least one of the first item, a distribution regulation, a consumer attribute, the attribute of the first item, a second item, an attribute of the second item, and a calculation based upon the attribute of the first item and the attribute of the second item, and
    wherein the second agent, determines a distribution decision based upon the distribution request data and a third regulation associated with the regulated goods, and
    wherein based upon the distribution decision, the second agent enters the distribution authorization into the agent interface in communication with the computer-based system.

14. The method of claim 1, further comprising:
executing, by the computer-based system, an artificial intelligence algorithm to determine an item-customer correlation, wherein the item-customer correlation is based upon at least one of a demographic, the purchase history, a complementary product, a product rating, a consumer location, a social networking attribute, a music service, a video service, a time, a date, a friend associated with the consumer, a promotion, a medical history, a physical characteristic, and a consumer habit;
matching, the item-customer correlation to a merchant goal to create a suggestion; and
communicating the suggestion to the consumer.

15. The method of claim 1, further comprising transmitting, by the computer-based system and to an app in communication with the computer-based system, a QR code in response to receiving an order comprising the first item, wherein the vending device receives the first input by scanning the QR code displayed in the app.

16. An article of manufacture including a non-transitory, tangible computer readable storage medium having instructions stored thereon that, in response to execution by a computer-based system for distributing regulated goods to a consumer, cause the computer-based system to be capable of performing operations comprising:
scanning, by a computer-based system comprising a vending device in the secured location, a credential of the consumer to identify credential data including a consumer attribute;
encrypting, by the computer-based system, the credential data using an encryption function to determine a hash code associated with the consumer;
transmitting, by the computer-based system, the hash code associated with the consumer to the vending device;
enabling, by the computer-based system, the vending device to receive a first input from the consumer in response to receiving the hash code, wherein the vending device comprises at least one of a keypad, a touch screen, and a scanner;
receiving, by the vending device, the first input comprising a first item selected by the consumer, wherein the regulated goods comprise a plurality of regulated items and the plurality of regulated items comprises the first item, wherein the first input comprises at least one of a touch screen entry, a keypad input, a scanned code, or electronically transmitted data from a user interface, wherein the first input is associated with the hash code;
determining, by the computer-based system, that the first item complies with a first regulation associated with the regulated items in response to an attribute of the first item and an attribute of the consumer comprising a purchase history of the consumer satisfying a rule associated with the first regulation,
wherein the rule comprises a limit of a cumulative attribute of the regulated items distributed over a period,
wherein the cumulative attribute comprises at least one of a cumulative weight, a cumulative amount of an active ingredient, and a cumulative amount;
transmitting, by the computer-based system, a distribution review request to authorize distribution of the first item from the vending device to the consumer;
receiving, by the computer-based system, a distribution authorization in response to a second input in an agent interface configured to run on a computing device in communication with the computer-based system; and
distributing, by the vending device, the first item to the consumer in response to receiving the distribution authorization.

17. A computer-based system comprising:
a processor for distributing regulated goods to a consumer;
a vending device in electronic communication with the processor and located in a secured location,
a tangible, non-transitory memory' configured to communicate with the processor, the tangible, non-transitory' memory having instructions stored thereon that, in response to execution by the processor, cause the computer-based system to perform operations comprising:
scanning a credential of the consumer to identify credential data including a consumer attribute;
encrypting the credential data using an encryption function to determine a hash code associated with the consumer;
transmitting the hash code associated with the consumer to the vending device;
enabling the vending device to receive a first input from the consumer in response to receiving the hash code, wherein the vending device comprises at least one of a keypad, a touch screen, and a scanner;
receiving the first input, comprising a first item selected by the consumer, wherein the regulated goods comprise a plurality of regulated items and the plurality of regulated items comprises the first item wherein the first input comprises at least, one of a touch screen entry, a keypad input, a scanned code, or electronically transmitted data from a user interface, wherein the first input is associated with the hash code;
determining that the first item complies with a first regulation associated with the regulated items in response to an attribute of the first item and an attribute of the consumer comprising a purchase history of the consumer satisfying a rule associated with the first regulation,
wherein the rule comprises a limit of a cumulative attribute of the regulated items distributed over a period,
wherein the cumulative attribute comprises at least one of a cumulative weight, a cumulative amount of an active ingredient, and a cumulative amount;
receiving, by the processor and from the vending device, a distribution review request to authorize distribution of the first item from the vending device to the consumer;
receiving, by the vending device and via the processor, a distribution authorization in response to a second input in an agent interface configured to run on a computing device in communication with the computer-based system; and
distributing the first item from the vending device to the consumer in response to receiving the distribution authorization.

* * * * *